(12) United States Patent
Jeong

(10) Patent No.: US 7,617,027 B2
(45) Date of Patent: Nov. 10, 2009

(54) SYSTEM FOR FAILURE SAFETY CONTROL BETWEEN CONTROLLERS OF HYBRID VEHICLE

(75) Inventor: Keum-Cheol Jeong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 621 days.

(21) Appl. No.: 11/299,382

(22) Filed: Dec. 8, 2005

(65) Prior Publication Data

US 2007/0112483 A1 May 17, 2007

(30) Foreign Application Priority Data

Nov. 11, 2005 (KR) ...................... 10-2005-0108180

(51) Int. Cl.
*G05D 3/00* (2006.01)
(52) U.S. Cl. ............................. 701/22; 701/29; 701/48; 701/1; 290/40 R; 318/139; 180/65.1; 180/65.2
(58) Field of Classification Search ................... 701/22, 701/29, 48; 290/40 R; 318/139
See application file for complete search history.

(56) References Cited

U.S. PATENT DOCUMENTS

| | | | | |
|---|---|---|---|---|
| 5,957,985 | A * | 9/1999 | Wong et al. .................... | 701/33 |
| 6,115,831 | A * | 9/2000 | Hanf et al. .................... | 714/43 |
| 6,330,498 | B2 * | 12/2001 | Tamagawa et al. ............ | 701/22 |
| 6,336,063 | B1 * | 1/2002 | Lennevi ........................ | 701/22 |
| 6,453,222 | B1 * | 9/2002 | Lasson et al. ................. | 701/22 |
| 6,463,373 | B2 * | 10/2002 | Suganuma et al. ............ | 701/48 |
| 6,512,967 | B2 * | 1/2003 | Ostberg et al. ................ | 701/22 |
| 6,577,935 | B1 * | 6/2003 | Petzold ........................ | 701/29 |
| 6,600,980 | B1 * | 7/2003 | Kraska et al. ................. | 701/22 |
| 6,603,278 | B2 * | 8/2003 | Oshima et al. ............... | 318/139 |
| 6,665,601 | B1 * | 12/2003 | Nielsen ........................ | 701/50 |
| 6,728,614 | B2 * | 4/2004 | Matsubara et al. ............ | 701/36 |

(Continued)

FOREIGN PATENT DOCUMENTS

JP 08-317501 11/1996

(Continued)

*Primary Examiner*—Khoi Tran
*Assistant Examiner*—Jonathan Sample
(74) *Attorney, Agent, or Firm*—Morgan, Lewis & Bockius LLP

(57) ABSTRACT

The present invention provides a system for failure safety control between controllers connected to an HCU via CAN communication. The system includes an ECU, an MCU, a TCU, a BMS and an HCU. The ECU is connected to the HCU via CAN communication, and configured to output a ready signal to the HCU and control operation of an engine. The MCU is connected to the HCU via CAN communication, and configured to output a ready signal to the HCU and control operation of a motor. The TCU is connected to the HCU, and configured to output a ready signal to the HCU and control operation of a transmission. The BMS is connected to the HCU via CAN communication, and configured to output a ready signal to the HCU and manage a state of a battery. The HCU is configured to output ready signals to the ECU, the MCU, the TCU and the BMS to control operation of the controllers, control a hybrid operation mode, and have CAN communication line signal detection terminals for detecting states of CAN communication connections to the controllers and ready signal detection terminals for detecting ready signals input from the respective controllers.

9 Claims, 3 Drawing Sheets

U.S. PATENT DOCUMENTS

| | | | |
|---|---|---|---|
| 6,885,113 B2 * | 4/2005 | Lim | 290/40 R |
| 7,349,479 B2 * | 3/2008 | Suganuma et al. | 375/257 |
| 2002/0099487 A1 * | 7/2002 | Suganuma et al. | 701/48 |
| 2005/0040709 A1 | 2/2005 | Enders et al. | |
| 2006/0101317 A1 * | 5/2006 | Uemura et al. | 714/746 |

FOREIGN PATENT DOCUMENTS

| | | |
|---|---|---|
| JP | 2000-152412 | 5/2000 |
| JP | 2000-156906 | 6/2000 |
| JP | 2000-156908 | 6/2000 |
| JP | 2000-156910 | 6/2000 |
| JP | 2000-156913 | 6/2000 |

* cited by examiner

FIG.2

| failure | HCU | ECU | MCU | TCU | BMS | Remark |
|---|---|---|---|---|---|---|
| HCU Fail | X | S.A | HEV function prohibition | S.A | HEV function prohibition | *S.A(Stand-Alone): HCU Command ignoring<br>*normal control: HCU Command acceptance<br><br>① control in cooperation with ECU at the time of CVT operation (Ex.N→D Shift)<br>② short distance movement using motor operation<br>③ motor-starting possible and idle stop prohibition<br>④ TCU-related control Limp Home control (torqus Reduction, Idle Torqus, Gear ratio variable) |
| HCU Fail (RDY Fail) | ① | normal control | HEV function prohibition | normal control | HEV function prohibition | |
| ECU RDY Fail | ② | X | normal control | S.A | normal control | |
| MCU RDY Fail | ① | normal control | X | normal control | HEV function prohibition | |
| TCU RDY Fail | ③ | ④ | normal control | X | normal control | |
| BMS RDY Fail | ① | normal control | HEV function prohibition | normal control | X | |

FIG.3

| failure | phenomenon | processing in HCU | Remark |
|---|---|---|---|
| Bus Off | CAN transmission/reception impossible | ECU/TCU/MCU/BMS CAN Timeout application of processing item | |
| ECU CAN Time Out | ECU CAN communication impossible | RPM replacement of signals<br>TPS replacement of signals<br>motor torque limitation<br>negative control L/H<br>alarm light operation | replacement of negative control A/C off command with Blower off |
| TCU CAN Time Out | TCU CAN communication impossible | increase in minimum idle RPM<br>idle stop prohibition<br>drive control motor torque limitation<br>vehicle speed signal replacement<br>alarm light operation | Tip-in shock reduction at the time of CVT H/W Limphome control |
| MCU CAN Time Out | MCU CAN communication impossible | motor use prohibition<br>motor RPM signal replacement<br>alarm light operation | |
| BMS CAN Time Out | BMS CAN communication impossible | motor torque limitation<br>alarm light operation | |

SYSTEM FOR FAILURE SAFETY CONTROL BETWEEN CONTROLLERS OF HYBRID VEHICLE

CROSS-REFERENCE TO RELATED APPLICATIONS

The present application is based on, and claims priority from, Korean Application Serial Number 10-2005-00108180, filed on Nov. 11, 2005, the disclosure of which is hereby incorporated by reference herein in its entirety.

FIELD OF THE INVENTION

The present invention relates generally to a system for failure safety control between the controllers of a hybrid vehicle and, more particularly, to a system for failure safety control between the controllers of a hybrid vehicle, in which a hybrid vehicle control unit processes the failures of the controllers that are controlled in response to the control signals of the hybrid vehicle control unit when controller area network communication lines are disconnected or short-circuited.

BACKGROUND OF THE INVENTION

In general, a hybrid vehicle (HEV) includes an Engine Control Unit (ECU) for controlling an engine, a Motor Control Unit (MCU) for controlling the operation of a motor, a Transmission Control Unit (TCU) for controlling the operation of a transmission, a Battery Management System (BMS) for monitoring and managing battery status, and a Hybrid vehicle Control Unit (HCU) for controlling the operation of the above-described controllers, setting a hybrid operation mode and the overall operation of a vehicle.

For the HCU to control the operation of the controllers, a Controller Area Network (CAN) communication line and a separate hard wire for limp-home mode control must be provided. In the case where a CAN communication line on a BMS side is disconnected, the HCU cannot be aware of the state of a battery and, thus, the HCU excessively charges the battery that operates a motor, which may cause harm to the system. Due to this phenomenon, a vehicle shock may occur, which may, in a serious case, result in damage to an engine. Therefore, a problem arises in that critical harm is caused to the vehicle by the disconnection of a single CAN communication line.

SUMMARY OF THE INVENTION

Embodiments of the present invention allow an HCU to process the failures of respective controllers when a CAN communication line is disconnected or short-circuited between the controllers of a hybrid vehicle.

The present invention provides a system for failure safety control between controllers connected to an HCU via CAN communication, including an ECU connected to the HCU via CAN communication, and configured to output a ready signal to the HCU and control operation of an engine; an MCU connected to the HCU via CAN communication, and configured to output a ready signal to the HCU and control operation of a motor; a TCU connected to the HCU, and configured to output a ready signal to the HCU and control operation of a transmission; a BMS connected to the HCU via CAN communication, and configured to output a ready signal to the HCU and manage a state of a battery; and the HCU configured to output ready signals to the ECU, the MCU, the TCU and the BMS to control operation of the controllers, control a hybrid operation mode, and have CAN communication line signal detection terminals for detecting states of CAN communication connections to the controllers and ready signal detection terminals for detecting ready signals input from the respective controllers.

BRIEF DESCRIPTION OF THE DRAWINGS

For a better understanding of the nature and objects of the present invention, reference should be made to the following detailed description with the accompanying drawings, in which:

FIG. 2 is a table illustrating the operation of an HCU and respective controllers when ready signals fail between the HCU and the respective controllers in the system according to the present invention; and FIG. 3 is a table illustrating the operation of the HCU when a CAN communication lines fail between the HCU and the respective controllers in the system according to the present invention.

DETAILED DESCRIPTION OF THE PREFERRED EMBODIMENTS

Figure 1:
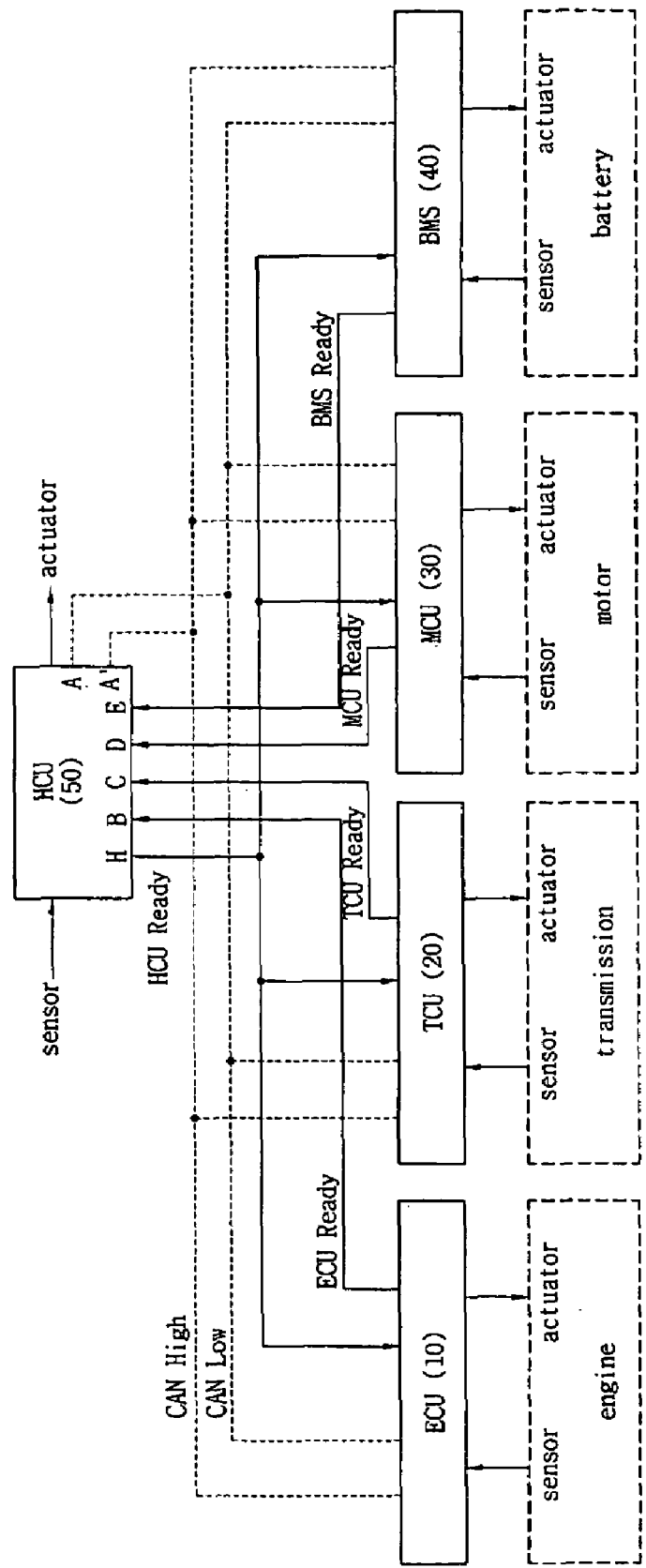
FIG. 1 is a diagram illustrating the construction of a system according to the present invention.

The construction of a system for failure safety control between the controllers of a hybrid vehicle according to an embodiment of the present invention is described with reference to FIG. 1.

As shown in FIG. 1, the system for failure safety control between controllers connected to an HCU via CAN communication, according to the present invention, includes an ECU 10 connected to the HCU 50 via CAN communication, and configured to output an ECU ready signal to the HCU 50 and control the operation of an engine; an MCU 30 connected to the HCU 50 via CAN communication, and configured to output an MCU ready signal to the HCU 50 and control the operation of a motor; a TCU 20 connected to the HCU 50, and configured to output a TCU ready signal to the HCU 50 and control the operation of a transmission; a BMS connected to the HCU 50 via CAN communication, and configured to output a BMS ready signal to the HCU 50 and manage the state of a battery; and the HCU 50 configured to output HCU ready signals to the ECU 10, the MCU 30, the TCU 20 and the BMS 40 to control the controllers, control a hybrid operation mode, and have CAN communication line signal detection terminals A and A' for detecting the states of CAN communication connections to the controllers and ready signal detection terminals B, C, D and E for detecting the ready signals input from the respective controllers.

That is, in the present embodiment, the CAN communication line signal detection terminals A and A' for detecting the states of signal connections between the HCU 50 and the respective controllers 10, 20, 30, 40 and the ready signal detection terminals B, C, D and E for detecting ready signals input from the respective controllers are provided, and the HCU and a corresponding controller perform operation control using the terminals when a signal line is disconnected or short-circuited therebetween.

The operation of the system for failure safety control between controllers according to the present embodiment, which has the above-described construction, is described with reference to FIGS. 1, 2 and 3. FIG. 2 is a table illustrating the control operation of the HCU and the respective controllers when ready signals fail between the HCU and the respective controllers, according to the present embodiment. FIG. 3 is a table illustrating the control operation of the HCU and the respective controllers when CAN communication lines fail (CAN High, CAN Low). For reference, in the present embodiment, the CAN communication line includes a CAN High Signal and a CAN Low Signal.

First, as shown in FIG. 2, when the HCU fails, the ECU and the TCU control the operation of the engine and the transmission in response to stand-alone control signals, and the MCU and the BMS are controlled such that a hybrid operation mode function is prohibited.

Furthermore, when a ready signal output from the HCU fails, the HCU performs control in cooperation with the ECU, the ECU and the TCU are normally controlled in response to the control signal of the HCU, and the MCU and the BMS are controlled such that a hybrid operation mode function is prohibited.

Furthermore, when a ready signal output from the ECU fails, the HCU outputs a motor operation control signal for the short distance movement of a vehicle, the MCU and the BMS are normally controlled in response to the control signals of the HCU, and the TCU controls the operation of the transmission in response to a stand-alone control signal.

Furthermore, when a ready signal output from the MCU fails, the HCU preforms control in cooperation with the ECU, the ECU and the TCU are normally controlled in response to the control signals of the HCU, and the BMS is controlled such that a hybrid operation mode function is prohibited.

Furthermore, when a ready signal output from the TCU fails, the HCU outputs a control signal for performing starting through the operation of the motor and prohibiting idle stop, and the ECU performs limp-home mode control related to the TCU, and the MCU and the BMS are normally operated in response to the control signals of the HCU.

Furthermore, a ready signal output from the BMS fails, the HCU preforms control in cooperation with the ECU, the ECU and the TCU are normally controlled in response to the control signals of the HCU, and the MCU is controlled such that a hybrid operation mode function is prohibited.

Meanwhile, as shown in the table of FIG. 3, when CAN communication between the HCU and the ECU is impossible, the HCU replaces an engine RPM signal with a motor RPM signal applied from the MCU, and a TPS signal with a modeled value stored in the HCU, and performs motor torque limitation, negative pressure limp-home mode control and alarm light control.

Furthermore, when CAN communication between the HCU and the TCU is impossible, the HCU replaces a minimum idle RPM increase, idle stop limitation, drive control motor torque limitation and a vehicle speed signal with modeled values stored in the HCU, and performs alarm light control.

Furthermore, when CAN communication between the HCU and the TCU is impossible, the HCU performs motor use prohibition, replaces a motor RPM signal with an engine RPM signal applied from the ECU, and performs alarm light control.

Furthermore, when CAN communication between the HCU and the BMS is impossible, the HCU performs motor torque limitation and alarm light control.

Finally, when transmission and reception cannot be performed through CAN communication because a CAN communication line bus is turned off between the HCU and the controllers, the operation of the controllers is preformed, as shown in FIG. 2.

As described above, in the present invention, failure safety control is achieved between the controllers of the hybrid vehicle through the control operation of the HCU, which is performed to process the failures of the respective controllers, and the control operation of the respective controllers when a CAN communication line between the controllers of a hybrid vehicle or a ready signal line is disconnected or short-circuited or the controllers fail,.

The interpretation of the technical scope of the present invention must not be limited to the above-described embodiment, but the technical scope of the present invention must be determined by the interpretation of the appended claims.

In accordance with the system for failure safety control between the controllers of a hybrid vehicle according to the present invention, when a signal line, that is, a ready signal line or CAN communication line, fails between the HCU and the controllers of the hybrid vehicle, the HVC and the controllers preform operation corresponding to failure safety, thus eliminating critically harm caused to a vehicle due to the disconnection/short circuit of the signal line.

What is claimed is:

1. A system for failure safety control between controllers connected to an Hybrid vehicle Control Unit (HCU) via Controller Area Network (CAN) communication, comprising:
    an Engine Control Unit (ECU) connected to the HCU via CAN communication, and configured to output a ready signal to the HCU and control operation of an engine;
    an Motor Control Unit (MCU) connected to the HCU via CAN communication, and configured to output a ready signal to the HCU and control operation of a motor;
    a Transmission Control Unit (TCU) connected to the HCU, and configured to output a ready signal to the HCU and control operation of a transmission;
    a Battery Management System (BMS) connected to the HCU via CAN communication, and configured to output a ready signal to the HCU and manage a state of a battery; and
    the HCU configured to output ready signals to the ECU, the MCU, the TCU and the BMS to control operation of the controllers, control a hybrid operation mode, and have CAN communication line signal detection terminals for detecting states of CAN communication connections to the controllers and ready signal detection terminals for detecting ready signals input from the respective controllers,
    wherein, when CAN communication between the HCU and the MCU is impossible, the HCU performs motor use prohibition, replaces a motor RPM signal with an engine RPM signal applied from the ECU, and performs alarm light control, and
    wherein, when CAN communication between the HCU and the BMS is impossible, the HCU performs motor torque limitation and alarm light control.

2. The system as defined in claim 1, wherein, when the HCU fails, the ECU and the TCU control the operation of the engine and the transmission in response to stand-alone control signals, and the MCU and the BMS are prohibited from a hybrid operation mode function.

3. The system as defined in claim 1, wherein, when a ready signal output from the HCU fails, the HCU performs control in cooperation with the ECU, the ECU and the TCU are normally controlled in response to a control signal of the HCU, and the MCU and the BMS are prohibited from a hybrid operation mode function.

4. The system as defined in claim 1, wherein, when a ready signal output from the ECU fails, the HCU outputs a motor operation control signal for short distance movement of a vehicle, the MCU and the BMS are normally controlled in response to the control signal of the HCU, and the TCU controls the operation of the transmission in response to a stand-alone control signal.

5. The system as defined in claim 1, wherein, when a ready signal output from the MCU fails, the HCU performs control in cooperation with the ECU, the ECU and the TCU are normally controlled in response to the control signals of the HCU, and the BMS is prohibited from a hybrid operation mode function.

6. The system as defined in claim 1, wherein, when a ready signal output from the TCU fails, the HCU outputs a control signal for performing staffing through operation of the motor and prohibiting idle stop, and the ECU performs limp-home mode control related to the TCU, and the MCU and the BMS are normally operated in response to the control signals of the HCU.

7. The system as defined in claim 1, wherein, when a ready signal output from the BMS fails, the HCU performs control in cooperation with the ECU, the ECU and the TCU are normally controlled in response to the control signals of the HCU, and the MCU is prohibited from a hybrid operation mode function.

8. The system as defined in claim 1, wherein, when CAN communication between the HCU and the ECU is impossible, the HCU replaces an engine RPM signal with a motor RPM signal applied from the MCU, replaces a TPS signal with a modeled value stored in the HCU, and performs motor torque limitation, negative pressure limp-home mode control and alarm light control.

9. The system as defined in claim 1, wherein, when CAN communication between the HCU and the TCU is impossible, the HCU replaces a minimum idle RPM increase, idle stop prohibition, drive control motor torque limitation and a vehicle speed signal with modeled values stored in the HCU, and performs alarm light control.

* * * * *